July 8, 1969  J. H. BECHTOLD ET AL  3,454,748

VARIABLE RESISTANCE HEATING ELEMENT

Filed June 9, 1967  Sheet 1 of 2

WITNESSES
Theodore F. Wrobel
Lee P. Johns

INVENTORS
James H. Bechtold and
Edward V. Somers
BY
Frederick Shupe
ATTORNEY

United States Patent Office 3,454,748
Patented July 8, 1969

3,454,748
VARIABLE RESISTANCE HEATING ELEMENT
James H. Bechtold, Pittsburgh, and Edward V.
Somers, Monroeville, Pa., assignors to Westinghouse Electric Corporation, Pittsburgh, Pa.,
a corporation of Pennsylvania
Filed June 9, 1967, Ser. No. 644,950
Int. Cl. H05b 3/12
U.S. Cl. 219—553                                    4 Claims

ABSTRACT OF THE DISCLOSURE

A heating element for an electric range which incorporates a resistance heating wire of an alloy containing about 65 to 75 weight percent cobalt and about 35 to 25 weight percent nickel, preferably about 68% cobalt and 32% nickel, and having an electrical resistance that increases substantially between room temperature and an elevated temperature and is characterized by a flat resistance curve portion at about 1800° F., whereby the time necessary for the heating element to reach a selected cooking temperature is minimized.

BACKGROUND OF THE INVENTION

Field of the invention

This invention relates to an alloy particularly suitable for use in heating elements for electric ranges, the alloy having electrical resistance characteristics such that it increases markedly with increasing temperature, and then levels off at a predetermined temperature.

Description of the prior art

The design of an electric heater element for use in cooking involves three important performance characteristics of an electric range surface heater; namely, power input, time required to heat the contents of a cooking pot or pan to a desired temperature, and heating efficiency. At the present time two major designs of heaters are used, they are a flat-spiral type and a flat-plate type. In each type a resistance element is embedded in an inorganic insulation and disposed in a sheath or flat package. Where the power input and the heater geometry are fixed, the design variables affecting heater performance are the heater-to-pot area, the relative heater-to-pot surface flatness, and the thermal capacity of the heater. An objective of electric heater units is to reduce the heating time and increase the efficiency of the range heaters.

Associated with the foregoing is the fact that the electrical resistivity of practically all prior known resistance wire used in heaters is substantially constant at a relatively high resistivity level, over the temperature range from about room temperature to a cooking temperature. Since the amount of electric power dissipated, $E^2/R$, is inversely proportional to the electrical resistance at any particular temperature, an alloy with constant electrical resistance requires an increase in voltage in order to increase the power input during the preliminary heatup time in order to reduce the amount of time necessary for the range element to reach a selected temperature, such as 1800° F., desirable for cooking units.

Heretofore electrical heater resistance wires were composed almost universally of a nickel-chromium alloy having a substantially constant electrical resistivity over the temperature range between room temperature and 1800° F. The time required to heat the wires to 1800° has been from 60 to 80 seconds at a voltage of 110 volts. When the voltage is increased, such as from 110 volts to 220 volts, the time to reach 1800° F. is reduced to approximately 20 seconds. The practice of reducing the heating time by "flashing" with double the normal voltage across the element for short periods of time, such as for 20 seconds, increases the power input to the resistance wire by 4 times and has been used by the industry for electric range heaters. However, such electric range heaters require the use of a special switch as well as both a 110 volt and a 220 volt source which adds to the cost of the basic electric range unit.

In accordance with this invention it has been found that the foregoing problems and disadvantages may be overcome by providing a heating wire of an alloy having an electric resistivity that varies, within a factor of about 8, from a low value at ambient temperature to high value at 1800° F., as compared with the nearly unit factor for electrical resistivity of the nickel-chromium alloy wire presently used in the heaters.

In addition to having an electrical resistivity that varies with temperature a suitable alloy must have two other charatceristics. First, the alloy should have no phase change within the useful temperature range and particularly at upper temperatures of use in order to avoid deterioration due to repeated changes in density and volume resulting from repeated cycles of heating and cooling.

Second, the alloy should have a small ratio of electrical resistivity at room temperature to resistivity at the Curie temperature or magnetic transformation temperature. Although, it is desirable to have a rapid rate of increase of resistance between room temperature and the Curie temperature, it is necessary that the resistivity remain substantially constant at temperatures above the Curie temperature to minimize certain instabilities.

Third, the alloy also should have a closed-packed face-centered-cubic crystal structure to minimize creep resulting from applied stresses.

Alloy compositions comprising about 65 to 75% of cobalt with balance of nickel, and preferably an alloy having about 68% to 70% cobalt and about 32% to 30% nickel satisfy the foregoing desired characteristics.

Accordingly, it is a general object of this invention to provide a heating element having a resistance wire that increases with the temperature as it is heated and then levels off at a desired elevated temperature.

It is another object of this invention to provide a heating element having an electrical resistivity that increases within a factor of about 8 between the ambient temperature and 1800° F.

It is another object of this invention to provide a heating element composed of a variable resistance alloy containing about 68% to 70% cobalt and about 32% to 30% nickel which has characteristics such that when used at a constant voltage the time necessary for the range element to reach a selected temperature such as 1800° F. is greatly reduced as compared to elements with nickel-chromium alloy wire used at constant voltage.

Finally, it is an object of this invention to satisfy the foregoing objects and desiderata in a simple and inexpensive manner.

SUMMARY OF THE INVENTION

The heating element of the present invention comprises a resistance heating wire composed of an alloy consisting of about 65% to 75% cobalt, and from 35% to 25% of nickel and preferably about 68% cobalt and about 32% nickel for an electric heating element, the wire having about an eight-fold increase resistivity over the temperature range of use.

BRIEF DESCRIPTION OF THE DRAWING

For a better understanding of the nature and objects of this invention, reference is made to the drawings, in which.

Similar numerals refer to similar parts throughout the several views of the drawings.

DESCRIPTION OF THE PREFERRED EMBODIMENTS

Figure 1:
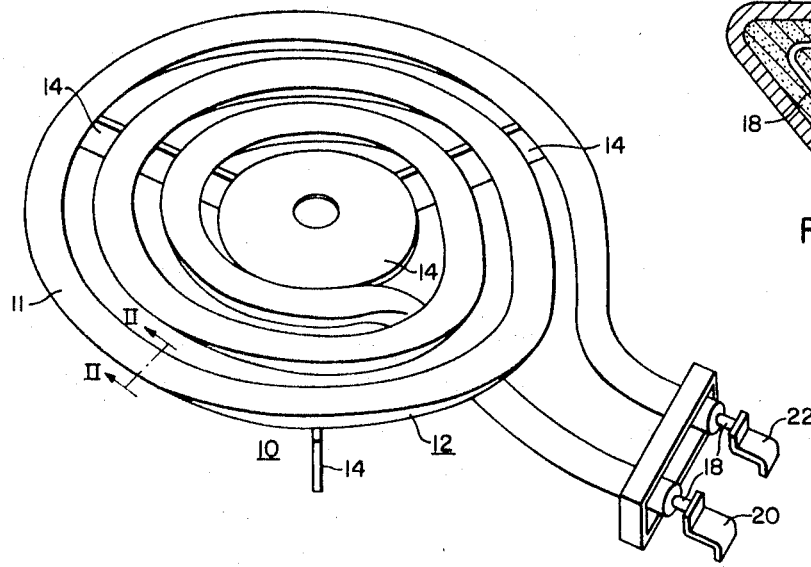
FIGURE 1 is a perspective view of a plug-in type heating element for an electric range.
Figure 2:
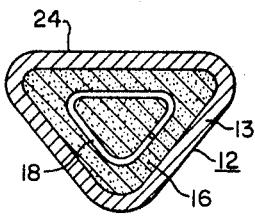
FIG. 2 is an enlarged sectional view taken on the line II—II of FIG. 1.

As shown in FIGS. 1 and 2, a heating unit which is generally indicated at 10 comprises an elongated heating element 12, which is formed into a flat helical shape disposed upon unit support means 14. The heating element 12 comprises a sheath 13 with inorganic electrical insulation 16 filling the sheath, and a resistance heating wire 18 disposed within the insulation and having terminals 20 and 22. The general configuration of the heating element 10 may be of any desired shape such as the helical configuration shown in FIG. 1. Moreover, the element 10 may have any cross section such as rectangular, a flat surfaced round, or triangular with a flat face 24 such as shown in FIG. 2. The outer casing or sheath 12 is a tubular member of an alloy having a high resistance to oxidation, and carbonization or attack by water or foods and generally useful in corrosive environments.

The sheath is preferably composed of an alloy containing approximately 32% nickel, 21% chromium, and 46% iron and is generally sold under the trademark Inconel. The sheath before shaping has a diameter of about ⅜ inch and is several feet long, is preferably wound concentrically from a straight tubular length into several loops and then coined into a triangular or other shape having a flat plane surface, to a substantially circular plug-in unit for use as a surface heater in an electric range. As such, the upper surface 24 of the sheath is preferably flat and coplanar with adjacent coiled sections so that a flat bottomed cooking pan or utensil placed on the top of the heater unit 10 has a maximum contact with the top surface 24 to maximize heat flow from the unit 10 to the cooking pan.

The interior of the casing 12 is filled with electrical insulation 16 for supporting the resistance heating wire 18 substantially centrally of the casing 12 and spaced therefrom substantially as shown in FIG. 2 to prevent an electrical shorting between the wire 18 and the sheath 12. The insulation 16 is preferably composed of highly compacted powdered or pulverized magnesium oxide.

The resistance heating wire 18 may be of any configuration such as an elongated rod or wire extending axially of the sheath or casing 12 from one end to the other. The wire 18, is preferably applied as a coiled member as shown in FIG. 2 in order to maximize the heating area of the wire within the casing 12.

The heating wire 18 has terminal portions which extend from the opposite open ends of the casing 12. The wire end portions are sealed within the end portions of the casing by a solid ceramic insulator so as to provide a hermetically sealed portion within the intermediate section of the casing 12.

The wire 18 is composed of a material having a variable resistivity which increases with the temperature at which the wire is operated as a heater. The electrical resistivity of the material of which the wire 18 is composed increases by factors as much as 2 to 12 times between room temperature and 1800° F.

Figure 3:
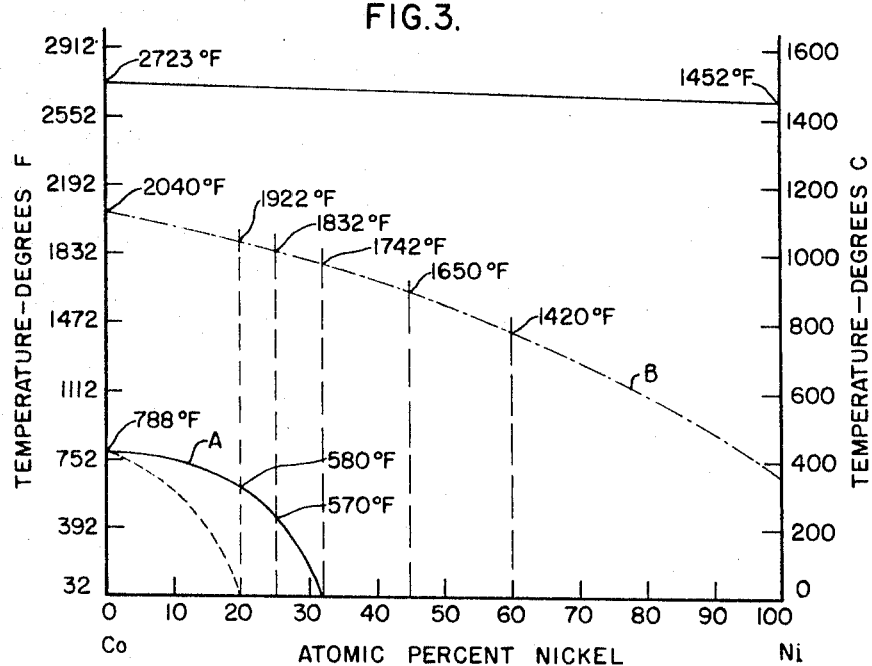
FIG. 3 is a phase diagram for cobalt-nickel and showing the Curie or magnetic transformation temperature line.

In accordance with this invention the wire 18 comprises compositions of from about 65% to about 75% by weight of cobalt and from about 35% to 25% of nickel. Minor amounts of incidental impurities may be present. The preferred alloy composition is about 68% cobalt and a balance 32% of nickel for achieving a satisfactory combination of primary characteristic; namely, (1) no phase change under normal conditions of use, (2) a Curie or magnetic transformation temperature at about the temperature limit of intended use, and (3) close-packed face-centered-cubic crystal structure. As shown in FIG. 3 the equilibrium boundary line A between the phases $\epsilon$ (epsilon) and $\alpha$ (alpha) has a maximum temperature of about 788° F. at 100% cobalt and diminishes to about 32° F. at about 68% cobalt. Within that percentage range of cobalt the magnetic transformation line B decreases from a high temperature of about 2040° F. to about 1740° F., and it continues to decrease to about 1420° F. at 60 nickel content. Accordingly, the preferred alloy composition is about 32% nickel with a balance of cobalt where the alloy involves no phase change from $\epsilon$ to $\alpha$ and the magnetic transformation temperature is about 1742° F.

However, the required upper operating temperature of the wire 18 may vary over a wide range. The alloy composition may contain as much as 60% nickel without deviating from the small ratio of electrical resistivity at room temperature to resistivity at the Curie temperature. The alloy composition may include up to about 20% nickel and 80% cobalt without the temperature of the phase change getting too high. The binary alloys having from about 20% to 32% nickel undergo a phase change from $\epsilon$ to $\alpha$ as the temperature of the alloy passes through the temperature corresponding to the line A. Since the phase change temperature varies from 32° F. to 580° F., the volume change in a wire as it is repeatedly heated into the $\alpha$ phase has a detrimental effect upon the durability of the wire, but the wire could be heated to higher temperatures without undergoing a magnetic transformation and the resulting decrease in the rate of increase of resistivity and minimum $\rho/\rho_0$. Deviation of composition of the alloy above and below the composition of about 32% nickel and 68% cobalt may be made either by sacrificing the upper temperature limit with increases in nickel content, or the durability of the wire by repeatedly heating the wire through the $\epsilon-\alpha$ transformation temperature.

The following example is illustrative of the present invention:

EXAMPLE

A wire composed of an alloy containing 70 wt. percent cobalt and 30 wt. percent nickel was prepared by mixing 4060 grams of powdered cobalt and 1740 grams of powdered nickel. Both the cobalt and nickel were electrolytically pure; i.e., each about 99.9+% pure. The mixture was placed in an MgO crucible, melted at 1600° C. under a vacuum of about 1 micron. While molten, hydrogen gas at a pressure of 5 mm. was flowed over the molten surface for 20 minutes to remove entrapped oxygen. Thereafter about 5.8 grams of calcium were added to remove substantially all of the oxygen. The chamber was then evacuated to 0.5 micron and while hydrogen was being rejected the melt was frozen in the crucible. The alloy was then remelted and poured into a steel mold having a ¾ inch bore and frozen. The resulting ingot was hot swaged to a rod of ⅜ inch diameter and then cold swaged to 90 mils diameter wire which was then drawn to a diameter of 30 mils.

The wire was subsequently reduced to a diameter of 0.01775 inch annealed for two hours at 1000° C. and tested for electrical resistivity at increasing temperature increments. The results of the test are shown in the table.

TABLE.—ELECTRICAL RESISTIVITY OF 70 Co-30 Ni ALLOY ANNEALED WIRE

[Specimen dia., 0.01775 in.; test length, 4.08 in.]

| Temperature (° F.) | Resistance (ohms) | Resistivity (ohms-c.m.f.) |
| --- | --- | --- |
| 74 | .05190 | 48.1 |
| 205 | .06814 | 63.2 |
| 310 | .08403 | 77.8 |
| 597 | .1452 | 134.5 |
| 699 | .1663 | 154.0 |
| 796 | .1932 | 179.5 |
| 899 | .2225 | 206.0 |
| 993 | .2527 | 234.0 |
| 1,096 | .2852 | 264.0 |
| 1,196 | .3200 | 296 |
| 1,308 | .3589 | 333 |
| 1,398 | .3947 | 366 |
| 1,496 | .4307 | 398 |
| 1,596 | .4713 | 437 |
| 1,699 | .5091 | 481 |
| 1,798 | .5453 | 506 |
| 1,896 | .5630 | 521 |
| 1,999 | .5753 | 534 |
| (¹) | | |

¹ The cooling curve was unattainable, due to a lead failure at the specimen, immediately after cooling from 2,000° F. c.m.f.=circular mil foot.

NOTE.—The above specimen was tested at temperatures indicated, using an L and N Kelvin Bridge and a continuous heating rate of approximately 10° F. per minute.

Figure 4:
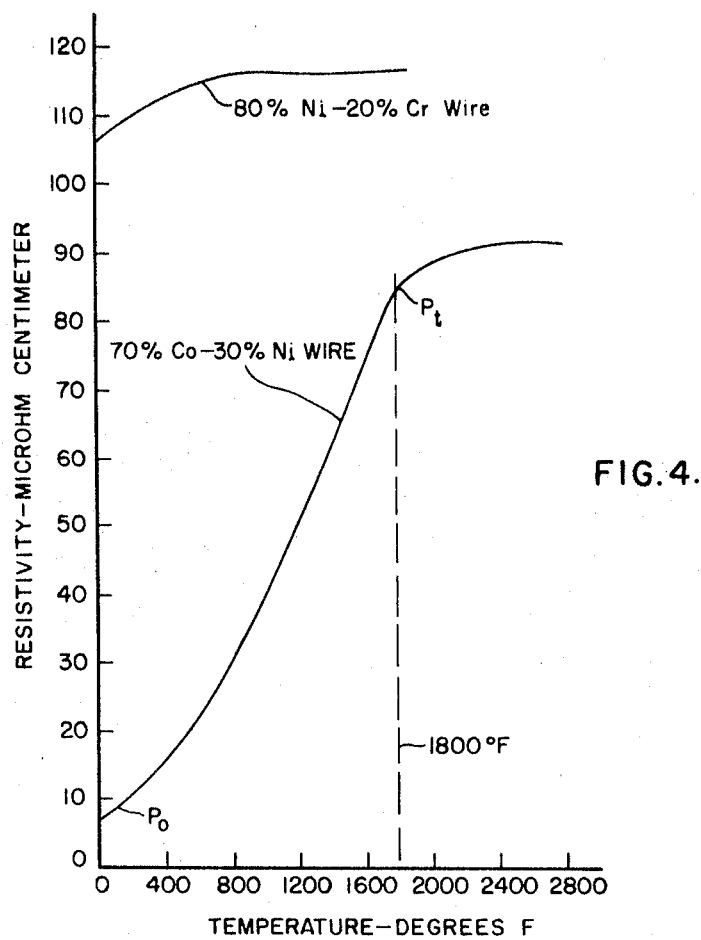
FIG. 4 is a graph showing the resistivity versus temperature for the 70% cobalt and 30% nickel alloy.

The resistivity-temperature values shown in the table are plotted in FIG. 4. The resistivity of this alloy increases more than 11 times; namely, from 48 to 535 ohms-c.m.f., on heating from room temperature to 2000° F. and above 1800° F. the curve levels off asymptotically in the preferred region of operation of the wire as a heating unit for an electric range surface burner. The rate of resistivity increase at this point is rapidly decreasing and has less effect upon the power dissipated, $E^2/R$, with increasing temperature. Of the pure metals only iron and cobalt approach these values but they incur phase transformations which make them undesirable as heating elements.

Figure 5:
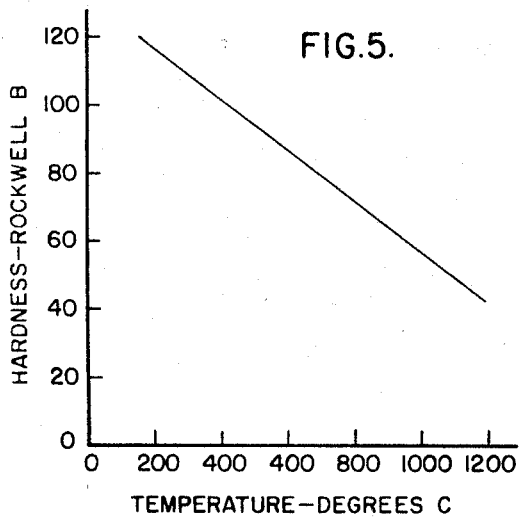
FIG. 5 is a graph of hardness versus annealing temperature of 70% cobalt and 30% nickel alloy.

FIG. 5 shows the variations in hardness with annealing temperature. As shown, the hardness can be varied as needed to achieve suitable coiling characteristics in the wire.

Although the alloy of 70% cobalt+30% nickel is not quite as oxidation resistant as the alloy of 80% nickel and 20% chromium, the wire 18 is hermetically sealed within a sheath 24 and there is little oxidation possible in any event. However, the 70% Co+30% Ni alloy is free from chromium evaporation as compared to the 80% Ni and 20% Cr alloy, and undergoes no reaction with the MgO insulation 16, which are primary reasons for any failure of the nickel-chromium alloy wire.

The heating time of such alloys can be calculated approximately with heat balance by neglecting convection and radiative losses for the range element, i.e., the transient heating period corresponds to that with the integrated electric power over the time interval set equal to the heat stored in the range element between ambient temperature and 1800° F. This can be expressed by Equation 1

(1)
$$\int_0^t Q\,dt = M_o \Delta T$$

The electrical resistivity of the wire varies almost linearly with the temperature between ambient and 1500° F. if nichrome has an electrical resistivity, $\rho_0$, roughly constant over the temperature range, the resistivity of the 70% cobalt and 30% nickel alloy can be represented by Equation 2

(2)
$$\rho = \rho_0(\alpha T + \beta)$$

The value of $\alpha$ and $\beta$ represent the resistivity-temperature coefficients and are used in the calculation for $\rho/\rho_0$ which vary from 0.10 at $T=0°$ F. to about 1.00 equal 1500° F.

Figure 6:
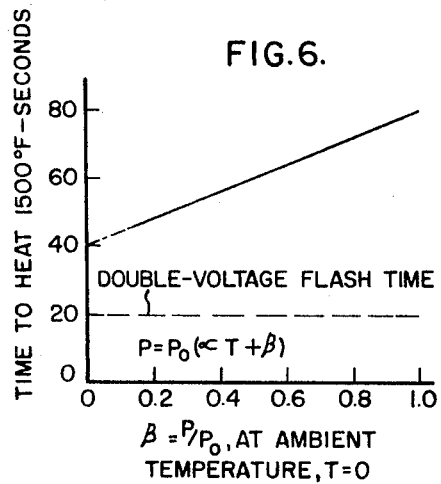
FIG. 6 is a graph of the time to heat to 1500° F. versus ratio of resistivity of ambient electrical resistivity.

The solution for heater alloys with $\rho/\rho_0$ between 0.00 and 1.00, at $T=0°$ F. and $\rho/\rho_0=1.00$, at 1500° F., with the electrical resistivity described by Equation 2 has been calculated and is shown in FIG. 6.

Improvements in heating time from 80 seconds to a value as low as 40 seconds are obtained. The lowest value of 40 seconds is still two times longer than that obtained with the double-voltage flashing technique. To obtain improvement below 40 seconds requires an alloy with a low resistivity over most of the required temperature range (0° to 1500° F.), i.e., the resistivity-temperature curve should be concave. The linear assumption of Equation 2 will somewhat over-estimate the time to heat. Other heater elements have been prepared and tested. Their performance was better than indicated in FIG. 6. This was due to the concavity of the curve of FIG. 4 in the lower temperature range.

Accordingly, the alloys of the present invention satisfy a long existing problem in the art of improving the time-to-temperature presently existing for conventional heating elements for electric ranges. The substitution of alloy heating wires having variable resistances which increase with the temperature of operation results in an increased power input during the heatup time and thereby reduces the amount of time necessary for the range element to reach a selected temperature.

It is understood that the above specification and drawings are merely exemplary and not in limitation of the invention.

What is claimed is:

1. An electrical heating element that is repeatedly heatable between ambient temperature and at least 1650° F., comprising an alloy member composed of about 65 to 75% of cobalt and the balance being nickel and minor amounts of incidental impurities and having a constant phase lattice structure above a maximum of about 570° F., having a ratio of electrical resistivity at room temperature to resistivity at the magnetic transformation temperature of from about 0.10 to 1.00 and the alloy member characterized by resistance which increases with increase in operating temperature, thereby reducing the time necessary to reach a selected temperature.

2. The heating element of claim 1 in which the alloy member is composed of about 70% of cobalt and of about 30% of nickel.

3. The heating element of claim 1 in which the alloy member is composed of about 68% cobalt and of about 32% of nickel.

4. In a heating unit for an electric range having an elongated tubular casing, a resistant heating wire within the casing and a dielectric material filling the casing and spacing the heating element from the casing, the improvement in which the resistant heating wire is composed of an alloy composed of about 65 to 75% of cobalt and the balance being nickel and having minor amounts of incidental impurities and having a constant lattice structure above a maximum of about 570° F. and having a ratio of electrical resistivity at room temperature to resistivity at the magnetic transformation temperature of 0.2 and a magnetic transformation temperature higher than 1650° F., and the heating wire characterized by resistance which increases with increase in operating temperature, thereby reducing the time necessary to reach a selected temperature.

References Cited

UNITED STATES PATENTS

| | | | |
|---|---|---|---|
| 2,192,491 | 3/1940 | Widell | 75—170 X |
| 2,765,391 | 10/1956 | Shroyer | 219—455 |
| 2,804,532 | 8/1957 | Lacy-Hulbert | 219—552 X |
| 2,836,492 | 5/1958 | Clark | 75—170 |
| 3,067,311 | 12/1962 | Lacy-Hulbert | 219—552 |
| 3,331,715 | 7/1967 | Bulina et al. | 148—142 |

OTHER REFERENCES

Ackerman, D. E., Metals Handbook, 1939 Edition, American Society for Metals, Cleveland, Ohio, Constitution of Nickel-Cobalt Alloys, pp. 1628-9 (copy in group 210).

VOLODYMYR Y. MAYEWSKY, *Primary Examiner*.

U.S. Cl. X.R.

29—611; 75—170; 219—449, 504; 338—25